United States Patent [19]

Kajigaya et al.

[11] Patent Number: 4,515,502
[45] Date of Patent: May 7, 1985

[54] MARINE FENDERS

[75] Inventors: Shinichi Kajigaya, Yokosuka; Mitsuo Nakaya, Yokohama, both of Japan

[73] Assignee: Bridgestone Tire Company Limited, Tokyo, Japan

[21] Appl. No.: 312,064

[22] Filed: Oct. 16, 1981

[30] Foreign Application Priority Data

Oct. 27, 1980 [JP] Japan .......................... 55-152108[U]

[51] Int. Cl.$^3$ ............................................... E02B 3/22
[52] U.S. Cl. ..................................... 405/215; 267/140
[58] Field of Search ................. 405/212, 215; 267/140, 267/141; 114/219

[56] References Cited

U.S. PATENT DOCUMENTS

| | | | |
|---|---|---|---|
| 3,160,407 | 12/1964 | Vaugoyeau | 267/141 X |
| 3,600,896 | 8/1971 | Tateisi et al. | 405/215 |
| 3,625,501 | 12/1971 | Hein et al. | 267/141 X |
| 4,258,641 | 3/1981 | Wakamiya | 114/219 |

Primary Examiner—David H. Corbin
Attorney, Agent, or Firm—Sughrue, Mion, Zinn, Macpeak & Seas

[57] ABSTRACT

A marine fender is disclosed, which comprises a hollow cylindrical body composed of rubber or rubbery elastic material, each end of which being provided with a flange for a quay wall or a shock receiving member, an annular rigid reinforcing plate embedded in each flange, and a fillet reinforcement provided on a foot portion of each flange. In the marine fender, an annular groove is further formed in a region adjacent to the fillet reinforcement at each end of the body.

9 Claims, 11 Drawing Figures

MARINE FENDERS

BACKGROUND OF THE INVENTION

This invention relates to marine fenders, and more particularly to an improvement of a so-called cell-type marine fender comprising a hollow cylindrical body composed of rubber or rubbery elastic material, one end of which being provided with a securing flange for a quay wall and the other end of which being provided with a fitting flange for a shock receiving member, an annular rigid reinforcing plate embedded in each of both the flanges, and a fillet reinforcement provided on a foot portion of each flange in the hollow cylindrical body.

The cell-type marine fenders of this type exhibit a transition curve against berthing shock in the transverse bulging deformation of the hollow cylindrical body under a berthing load. This extends from a stage of reducing an increasing rate of reaction force through a stage of maintaining reaction force at a substantially fixed value or a so-called buckling deformation stage to a compression deformation stage produced at mutual contacting state of the inner surface of the hollow cylindrical body. This is shown by a solid line B in FIG. 1, and hence these devices have a largely high absorption energy, so that they are widely and favorably used in Japan and other countries.

In order to have an accurate occurrence of the above buckling deformation, however, there has hitherto been taken such a means that a pair of annular grooves are arranged near boundaries of an initial outward-bulging region in the hollow straight cylindrical body produced under a vertical load subjected thereto. FIG. 2 illustrates a conventional marine fender, wherein numeral 1 designates a hollow cylindrical body, numeral 2 a flange used for securing the fender or fitting a shock receiving member, numeral 3 an annular groove, numeral 4 an annular rigid reinforcing plate embedded in the flange 2, numeral 5 a fillet reinforcement provided on a foot portion of the flange 2, and numeral 6 a bolt hole for the flange 2.

The conventional cell-type marine fender takes a final posture at the compression deformation as shown in FIG. 3, from which it is apparent that straight cylindrical portions 1'a remain near both ends of the body 1 because the buckling deformation is restricted by the annular groove 3. After buckling deformation, the mutual contacting 7 of the inner surface of the body 1 is produced to transfer the deformation into such a simple compression deformation that the characteristic curve B of FIG. 1 rises steeply. That is, the conventional marine fender is compressed up to a value of subtracting a deformation quantity $\delta_1$ from a height of the cell-type marine fender or a distance H between the outer surfaces of the flanges. Therefore, the deformation progress of the hollow cylindrical body 1 is disadvantageously restricted by the annular groove 3.

SUMMARY OF INVENTION

It is, therefore, an object of the invention to eliminate the above mentioned disadvantage and to conduct the deformation of the hollow cylindrical body over substantially the total height thereof.

According to the invention, there is provided in a marine fender comprising a hollow cylindrical body composed of rubber or rubbery elastic material, one end of which being provided with a securing flange for a quay wall and the other end of which being provided with a fitting flange for a shock receiving member, an annular rigid reinforcing plate embedded in each of both the flanges, and a fillet reinforcement provided on a foot portion of each flange in the hollow cylindrical body, the improvement wherein an annular groove is formed in a region adjacent to said fillet reinforcement at each end of said body.

BRIEF DESCRIPTION OF THE DRAWINGS

The invention will now be described with reference to the accompanying drawings, wherein.

DESCRIPTION OF THE PREFERRED EMBODIMENT

Figure 1:
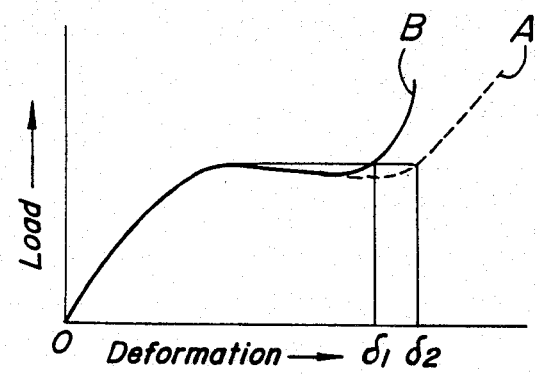
FIG. 1 is a diagram illustrating load-deformation curve of the cell-type marine fender.
Figure 3:
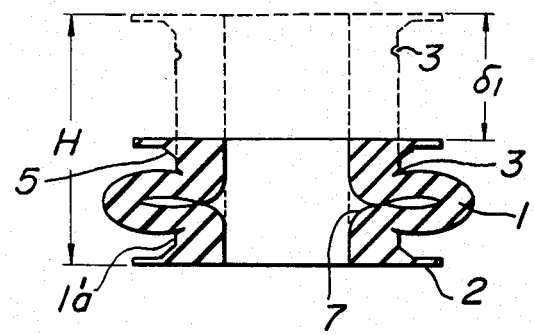
FIG. 3 is a diagrammatic view illustrating the deformation behavior of the marine fender of FIG. 2.
Figure 4:
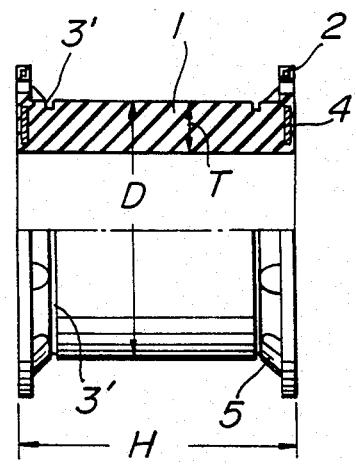
FIG. 4 is an elevational view in section of an embodiment of the marine fender according to the invention.
Figure 5:
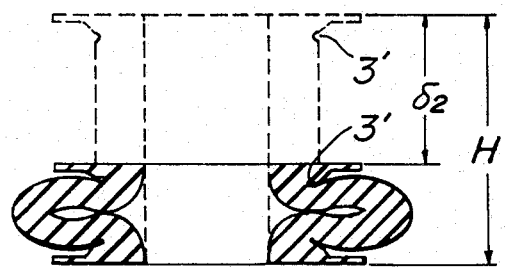
FIG. 5 is a diagrammatic view illustrating the deformation behavior of the marine fender of FIG. 4.

According to the invention, an annular groove 3' is formed in a region adjacent to the fillet reinforcement 5 provided on the foot portion of each flange 2 over a periphery of the body 1. As a result, the buckling deformation is forcedly raised by the annular groove 3', whereby the deformation quantity is enlarged up to a value of $\delta_2$ in the final posture at the compression deformation of the cell-type marine fender according to the invention as shown in FIG. 5 corresponding to FIG. 3. Consequently, the characteristic curve for energy is considerably improved as shown by a broken line A in FIG. 1.

In the preferred embodiment of the invention, each of a pair of annular grooves 3' is disposed in a region adjacent to the fillet reinforcement corresponding to a range of 0.07 to 0.2 times a distance H between the flanges as measured from the flange at each end of the body. For instance, when this definition is applied to the cell-type marine fender having a standard size of distance H between the flange is 1,450 mm, an outer diameter D of the hollow cylindrical body is 1,360 mm, a wall thickness T of the body is 225 mm and a diameter of the flange is 1,850 mm, total compression strain is increased by about 5%, and as a result the absorption energy can be increased by 10 to 15%.

Moreover, there has been proposed a cylindrical marine fender having the same size and provided with a plurality of annular grooves in Japanese Patent laid open No. 129,696/79. As a result of the comparison with this fender, it has been confirmed that the invention is fairly superior to this article.

This fact will be described in detail in accordance with the following experiment. That is, there were provided seven marine fenders having the same size to be tested. Among them, fender performances were first examined with respect to five test products having a pair of annular grooves 3' wherein the position of each of the grooves 3' is different within a range of 0.03 to 0.25 times the distance H between the flanges as measured from the outer surface of the flange 2.

| Test product 1 | |
|---|---|
| position of outer edge of annular groove | 45 mm (0.03 H) |
| size of annular groove | semicircle with a radius of 25 mm |
| Test product 2 | |
| position of outer edge of annular groove | 100 mm (0.07 H) |
| size of annular groove | semicircle with a radius of 20 mm |
| Test product 3 | |
| position of center of annular groove | 200 mm (0.14 H) |
| size of annular groove | semicircle with a radius of 15 mm |
| Test product 4 | |
| position of inner edge of annular groove | 290 mm (0.2 H) |
| size of annular groove | semicircle with a radius of 10 mm |
| Test product 5 | |
| position of center of annular groove | 360 mm (0.25 H) |
| size of annular groove | semicircle with a radius of 5 mm |

Figure 6:
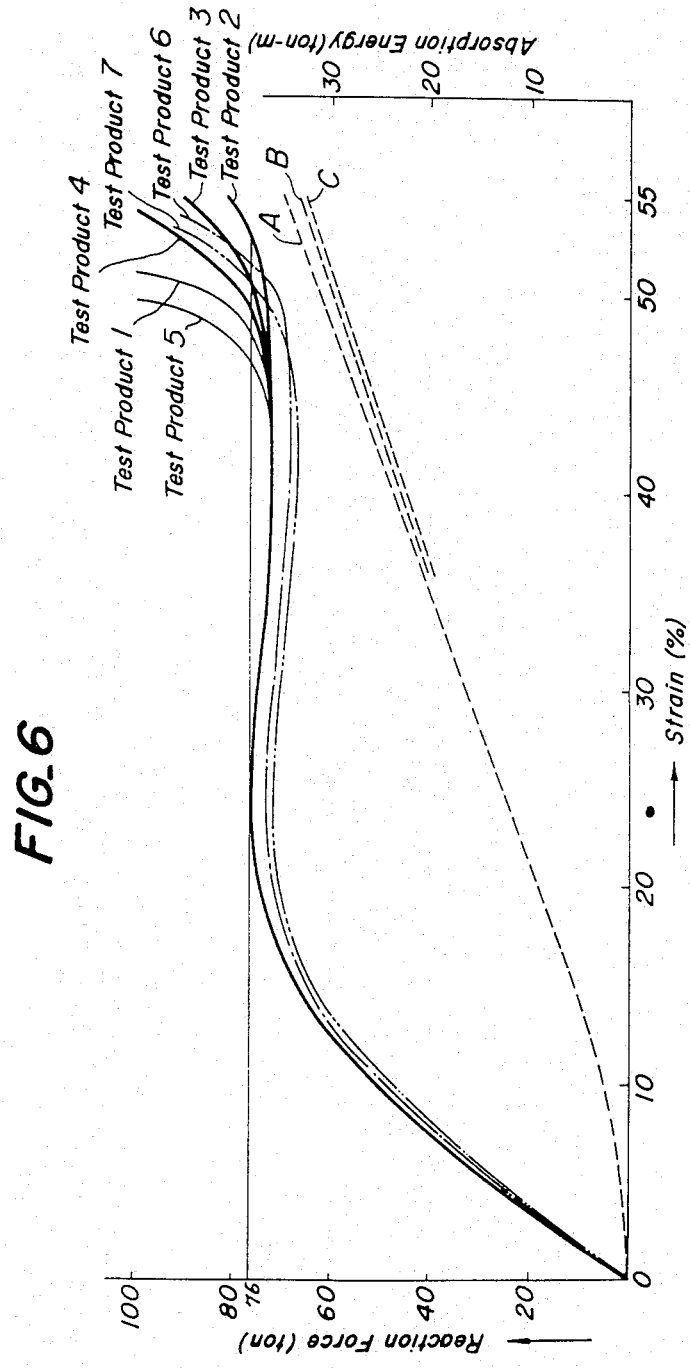
FIG. 6 is a diagram illustrating strain-reaction force curve (solid line) and strain-absorption energy curve (broken line) of each of marine fenders to be tested.

The compression test was made with respect to each test product to obtain a result of strain-reaction force curve as shown by solid lines in FIG. 6. Then, the absorption energy was calculated from the above result and indicated by a broken line A in the same figure. From the fact that the maximum value of reaction force is 76 ton in the strain-reaction force curve, it was first determined that the use range of each test product until the absorption energy per unit reaction force becomes maximum was a value up to 76 ton. Thereafter, the absorption energy of each test product was read from FIG. 6 as follows:

| Test product 1 | 29.0 ton · m |
|---|---|
| Test product 2 | 33.0 ton · m |
| Test product 3 | 32.0 ton · m |
| Test product 4 | 30.8 ton · m |
| Test product 5 | 28.3 ton · m |

Figure 2:
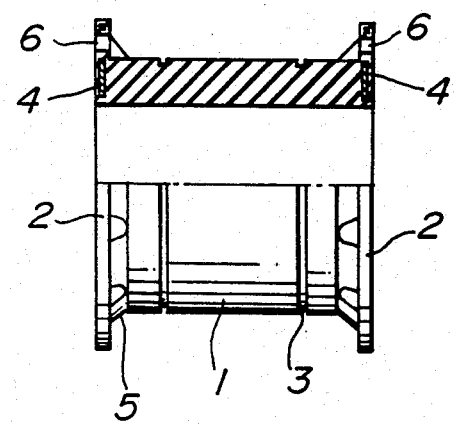
FIG. 2 is an elevational view in section of the conventional cell-type marine fender.

As apparent from the above, the test products 2, 3 and 4 are considerably higher in the absorption energy than the test product 5 corresponding to the prior art of FIG. 2 as well as the test product 1 having the annular groove located in the fillet reinforcement 5 as a comparative example. Thus, the absorption energy in the test products 2-4 according to the invention is increased 9 to 17% against the prior art corresponding to the test product 5.

Further, as shown in FIG. 6, the strain of the prior art corresponding to the test product 5 is about 46%, while the strains of the test products 2-4 are 52%-49%, which shows the increase of about 5 to 6% against the prior art.

When the annular groove 3' has a semicircular shape and is located in a region of 0.07H to 0.2H with respect to the distance H between the flanges, the minimum radius of the groove 3' capable of forcedly producing the buckling deformation is preferably within a range of 0.006H to 0.015H in case of the test product 2 as a result of these experiments.

Figure 7A:
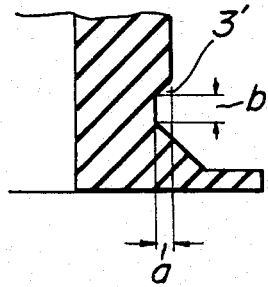
FIGS. 7a and 7d are schematically fragmentary sectional views of concrete embodiments of the annular groove according to the invention.
Figure 7B:
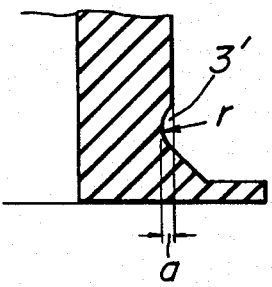
Figure 7C:
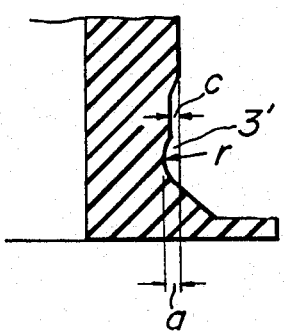
Figure 7D:
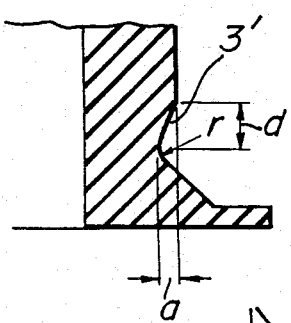

Moreover, the sectional shape of the annular groove 3' can be changed as shown in FIGS. 7a to 7d, wherein FIG. 7a shows a trapezoidal groove having a depth a and a bottom width b, FIG. 7b shows an arc groove having a depth a and a radius r, FIG. 7c shows a combination of the same arc groove as shown in FIG. 7b and a flat groove having a depth c adjacent to the inner edge of the arc groove, and FIG. 7d shows a round-bottom triangular groove having an oblique wall of a width d tangential to the arc groove. In this case, the fender performances can advantageously be improved without difficulties relative to the strength of the hollow cylindrical body by selecting the dimensions a, b, c, d and r from ranges of a: 0.005-0.01H, b: 0.01-0.1H, c: 0.001-0.01H, d: 0.01-0.2H and r: 0.005-0.02H.

Next, the same experiment was made with respect to cylindrical marine fenders having the same size as described above and provided with a plurality of annular grooves.

Test product 6

Two annular grooves are arranged at the positions of test products 2 and 3.

Test product 7

Three annular grooves are arranged at positions of test products 2, 3 and 4.

As a result of this compression test, the test products 6 and 7 have strain-reaction force curves as shown by dot-dash-lines in FIG. 6, from which are obtained absorption energies as shown by broken lines B and C in FIG. 6. In the use range until the reaction force is 76 ton, the absorption energy of each of the test products 6 and 7 is as follows:

| Test product 6 | 29.0 ton · m |
|---|---|
| Test product 7 | 28.5 ton · m |

As apparent from the above, the absorption energy of the test products 2-4 according to the invention is increased 14 to 16% against the test products 6 and 7 provided with the plural annular grooves. This is due to the fact that when the cylindrical marine fender provided with the plural annular grooves is subjected to compression deformation, the outwardly bulging deformation of the hollow cylindrical body is easily produced due to the presence of the plural annular grooves. As a result the reaction force becomes lower over the substantially whole progress of the strain (see FIG. 6) and the absorption energy reduces.

Figure 8:
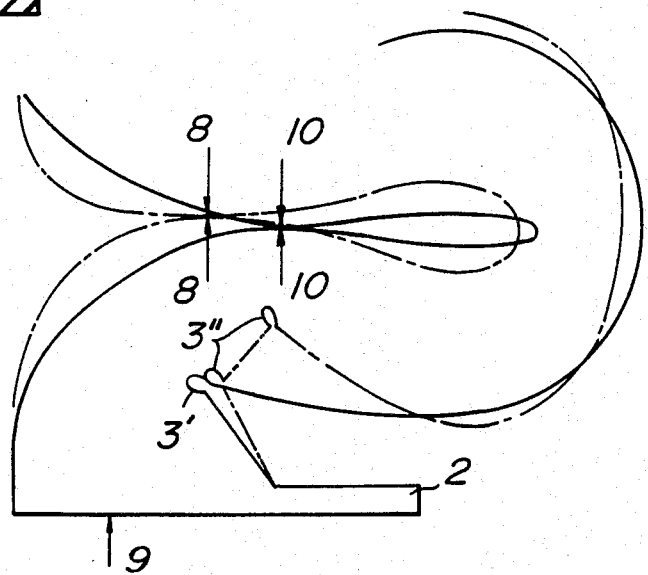
FIG. 8 is a fragmentary sectional view illustrating final compressed states of the marine fender according to the invention and the conventional marine fender provided with plural annular grooves.

Furthermore, as shown by a dot-dash-line in FIG. 8, the hollow cylindrical body bulges outward at the plural annular grooves 3" in the final posture of the compression deformation, so that the mutual contacting of the inner surface of the cylindrical body is caused at a relatively inward position of the bulged portion as shown by an arrow 8. As a result, a length of moment arm between the contact point 8 and a point of application at the flange 2 (arrow 9) is short viewing the sectional shape and hence a so-called spring constant becomes high and also the rising from the final compression state is steep. Therefore, if the cylindrical marine fender provided with the plural annular grooves 3"

exceeds the limit of the use range, there may be a problem of damaging vessels or quay equipment. Particularly, the fender performance at a position slightly exceeding the use range is significant because the vessel is frequently berthed at a speed exceeding a predetermined berthing speed. In this connection, the annular groove 3 is not located near the flange 2 in the test product 5 as a prior art, so that the bending of the cylindrical body is not sharp and mutual contacting of the inner surface is located at a relatively inward position of the bulged portion and hence rising from the final compression state becomes steep.

According to the invention, the hollow cylindrical body is bent at a position near the flange 2 as shown by a solid line in FIG. 8, so that bending is sharp and hence mutual contacting of the inner surface is located at a relatively outward position of the bulged portion (arrow 10) as compared with the case of the prior art. As a result, rising from the final compression state is mild as shown in FIG. 6, so that even if the fender exceeds the limit of the use range, dangerous situations are not caused rapidly.

As mentioned above, in the cell-type marine fender according to the invention, the annular groove is positioned in the region adjacent to the fillet reinforcement provided on the foot portion of the flange at each end of the hollow cylindrical body, so that the bulging deformation resulting from vertical load acting to the fender is conducted in the vicinity of the foot portion of the flange, whereby compression deformation progress of the hollow cylindrical body inclusive of the buckling deformation after the above bulging deformation is enlarged so as to extend over the substantially whole length thereof without influencing on the fitting strength of the flange. As a result, the fender performance is considerably improved and rising from the final compression state is more mild, so that the fender according to the invention can fully move against the abnormal berthing of the vessel.

What is claimed is:

1. A marine fender comprising; a hollow cylindrical body composed of rubber or rubbery elastic material, one end of which having a securing flange for a quay wall, the other end of which having a fitting flange for a shock receiving member, an annular rigid reinforcing plate embedded in each of both the flanges, a fillet reinforcement provided on a foot portion of each of said flanges in said body and an annular groove formed in an outside wall of said hollow cylindrical body in a region adjacent to said fillet reinforcement at each end of said body within a range of 0.07H to 0.2H, wherein H is a distance between said flanges, as measured from each flange.

2. The marine fender of claim 1 wherein said annular groove is trapezoidal in cross section.

3. The marine fender of claim 2 wherein said annular groove has an inner wall width in the range of 0.01–0.1H and a depth in the range of 0.005–0.01H.

4. The marine fender of claim 1 wherein said annular groove is arcuate in cross section.

5. The marine fender of claim 4 wherein said annular groove has a radius of curvature in the range of 0.005–0.02H.

6. The marine fender of claim 1 wherein said annular groove comprises an arcuate section and an adjacent flat section.

7. The marine fender of claim 6 wherein said arcuate section has a radius of curvature in the range of 0.005–0.02H and said flat section has a depth in the range of 0.001–0.01H.

8. The marine fender of claim 1 wherein said groove comprises an arcuate round-bottom triangular groove having an oblique wall tangential to said arcuate portion.

9. The marine fender of claim 8 wherein said arcuate round-bottom groove has a depth in the range of 0.005–0.01H and said oblique has length from the inner most portion of said groove to said outside wall in the range of 0.01–0.2H.

* * * * *